United States Patent [19]

Adlerborn et al.

[11] Patent Number: 4,579,703
[45] Date of Patent: Apr. 1, 1986

[54] METHOD OF MANUFACTURING ARTICLES OF CERAMIC MATERIAL

[75] Inventors: Jan Adlerborn; Hans Larker; Bertil Mattsson; Jan Nilsson, all of Robertsfors, Sweden

[73] Assignee: Asea Aktiebolag, Västerås, Sweden

[21] Appl. No.: 355,700

[22] Filed: Mar. 8, 1982

[30] Foreign Application Priority Data

Mar. 10, 1981 [SE] Sweden ................... 8101509

[51] Int. Cl.$^4$ ............... B29C 43/10; B28B 11/04
[52] U.S. Cl. .................................. 264/58; 156/89; 264/60; 264/62; 264/63; 264/79; 264/125; 264/325; 264/332; 416/229 A; 416/241 B
[58] Field of Search ............... 264/60, 63, 325, 332, 264/125, 261, 570, 56, 58, 62, 79; 156/89; 416/229 A, 241 B

[56] References Cited

U.S. PATENT DOCUMENTS

| | | | |
|---|---|---|---|
| 3,079,136 | 2/1963 | Soine | 264/128 |
| 3,311,522 | 3/1967 | LeRoy | 264/332 |
| 3,887,411 | 6/1975 | Goodyear et al. | 264/66 |
| 4,023,966 | 5/1977 | Loersch et al. | 425/405 H |
| 4,112,143 | 9/1978 | Adlerborn et al. | 264/570 |
| 4,256,688 | 3/1981 | Adlerborn | 264/325 |
| 4,296,065 | 10/1981 | Ishii | 264/325 |
| 4,381,931 | 5/1983 | Hunold | 264/65 |
| 4,384,909 | 5/1983 | Layden | 264/65 |
| 4,460,527 | 7/1984 | Kato | 264/60 |

Primary Examiner—Jeffery Thurlow
Attorney, Agent, or Firm—Watson, Cole, Grindle & Watson

[57] ABSTRACT

In the manufacture of an article of ceramic material, for example a bladed turbine wheel of silicon nitride, there is first formed a plurality of article parts, at least one of which is a shaped powder body formed from powder of ceramic material mixed with a plasticizer, after which the plasticizer is driven off by a suitable heating operation. The article parts are then assembled together into a configuration conforming to that of the article to be manufactured, and the assembled article parts are surrounded with a gas-impermeable layer, for example a layer of glass. Finally, the assembled parts are isostatically pressed at elevated temperature to form the assembled article parts into a dense, homogeneous article.

9 Claims, 4 Drawing Figures

METHOD OF MANUFACTURING ARTICLES OF CERAMIC MATERIAL

TECHNICAL FIELD

This invention relates to a method of manufacturing an article of ceramic material by shaping a body of powder to a shape similar to that desired in the finished article and subsequently subjecting the powder body to a hot isostatic pressing operation.

BACKGROUND ART

When manufacturing an article from ceramic material, the starting material can be a powder which is mixed with a plasticizer which constitutes a temporary binder during shaping of the powder into a body of a known technique for ceramic materials, for example by injection moulding. The temporary binder may consist, for example, of methyl cellulose, cellulose nitrate, an acrylic binder, a wax or a mixture of waxes. After the shaping of the powder body, the binder is driven off by heating, so that the powder body becomes substantially free of binder, and then the body is subjected to sintering. When it is a question of making an article of complicated shape using a material which is difficult to sinter, for example gas turbine blade wheels of silicon nitride, it is known to employ hot isostatic pressing for pressing the shaped powder body, since this method provides an all-sided pressure, uniform reduction of dimensions and insignificant distortion. In order to prevent pressurized gas from penetrating into the powder body during the hot isostatic pressing operation, the shaped powder body is surrounded by a gas-impermeable casing, usually of glass. Different methods of performing such hot isostatic pressing operations are described in greater detail in published British Patent Applications Nos. 2024255A (published Jan. 9th, 1980) and 2048952A (published Dec. 17th, 1980).

The driving off of the temporary binder requires a long time for powder bodies of large cross-section and there is a high risk of crack formation, because an internal overpressure may arise due to evaporation of the binder.

The present invention aims to provide an improved method of manufacturing an article of ceramic material of large cross-section, particularly an article having different portions of large and small cross-sections, for example a blade wheel for a gas turbine having a solid central body with projecting thin blades.

DISCLOSURE OF THE INVENTION

According to the invention, a method of manufacturing an article of ceramic material comprises the steps of forming a plurality of article parts, at least one of which is a shaped powder body formed from a composition containing a powder of ceramic material mixed with a plasticizer, driving off the plasticizer from the at least one part, assembling the article parts together into a configuration conforming to that of the article to be manufactured, surrounding the assembled article parts with a gas-impermeable layer, and isostatically pressing the assembled article parts at elevated temperature.

In order to prevent, during the isostatic pressing operation, any penetration of the gas-impermeable layer into any joints between the assembled article parts, the method may comprise the further steps, prior to surrounding the assembled article parts with the gas-impermeable layer, of covering the joints between the article parts with jointing material comprising powder mixed with a plasticizer, and driving off the plasticizer from the jointing material.

All of the article parts may be shaped from powder material mixed with a plasticizer. Alternatively, at least one, but not all, of the parts, in particular parts of simple geometric shape, may be formed by cold isostatic pressing of powder material without the addition of a plasticizer or binder.

As has been mentioned previously, the method in accordance with the invention is particularly suitable for manufacturing an article in the form of a turbine wheel. In this case, the article parts preferably consist of a hub part which includes a shaft, and a ring part which includes projecting blades. The hub part and the ring part are advantageously constructed with an external frusto-conical surface and an internal frusto-conical surface, respectively. During assembly of the two parts, a layer of powder may be applied on the surfaces which confront one another in the assembled article, so that all play is eliminated between the assembled parts. Any plasticizer in this powder layer must be driven off before hot isostatic pressing of the assembled parts is performed.

In such a turbine wheel, the hub part with the shaft has a large cross-section, whereas the ring part with the projecting blades has a smaller cross-section. Therefore, it is more difficult to drive off the plasticizer from the hub part than from the ring part. The method in accordance with the invention has the great advantage that it enables the hub part to be injection moulded, or compression moulded, from powder mixed with a plasticizer which has a low molecular weight and is easily driven off. Alternatively, a hub part may be made from powder which has been cold isostatically pressed. Whichever of these methods is used for making the hub part, it will have a low strength, which can be accepted since the part has a simple geometric shape. The ring part with its thin blades, which require a high strength after injection moulding, can be moulded from a powder mixed with a plasticizer of higher molecular weight, since the small cross-section of the ring part facilitates the driving off of the plasticizer.

BRIEF DESCRIPTION OF THE DRAWING

The invention will now be described, by way of example, with reference to the accompanying drawing, in which.

DESCRIPTION OF PREFERRED EMBODIMENTS

Figure 1:
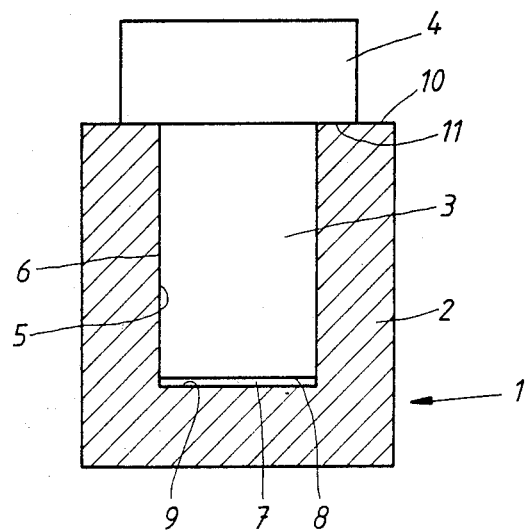
FIG. 1 is a sectional side view of an article of ceramic material of large cross-section, but of very simple shape.

The article shown in FIG. 1 is composed of a cup-shaped cylindrical part 2 and a shaft part 3 having an integral flange 4. The parts 2 and 3 are pressed individually from a powder, for example silicon nitride, mixed with a plasticizer. Before the parts 2 and 3 are assembled together, the plasticizer is driven off by a suitable heating of the parts. This driving off of the plasticizer is facilitated by the fact that the distance from the innermost portions of the parts 2, 3 to a surface thereof is considerably smaller than if the entire article were to be formed in one piece. The parts 2 and 3 are then assembled together, after any necessary machining to ensure that the play between the internal cylindrical surface 5 of the part 2 and the confronting external surface 6 of the part 3 is small. The portion of the part 3 which enters the part 2 is given a length which is somewhat smaller than the depth of the bore of the part 2, so that a gap 7 is formed between the end surface 8 of the part 3 and the surface 9 of the part 2. The upper end surface 10 of the part 2 and the lower end surface 11 of the flange 4 are formed so as to obtain close contact between these surfaces. The assembled parts 2 and 3 are then encapsulated with a material which either provides a gas-tight casing or which forms a gas-tight casing when heated, for example glass. Finally, the encapsulated parts are subjected to hot isostatic pressing in known manner, to provide a dense, homogeneous article of the desired shape. Since there is no gap, or only an extremely small gap, between the confronting surfaces 10 and 11 of the parts 2 and 3, the encapsulating material is unable to penetrate between the parts 2 and 3 during the hot isostatic pressing operation.

Figure 2:
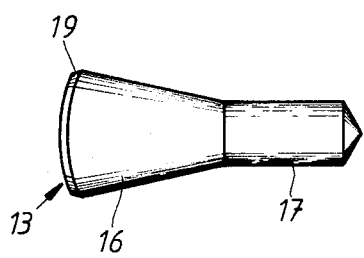
FIGS. 2 and 3 are a side view and a sectional side view, respectively, of parts of a turbine wheel of ceramic material.
Figure 3:
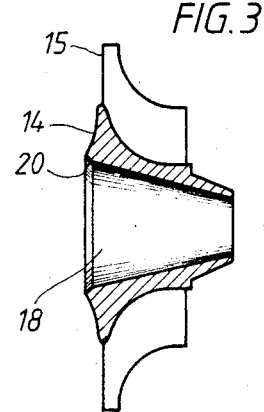
Figure 4:
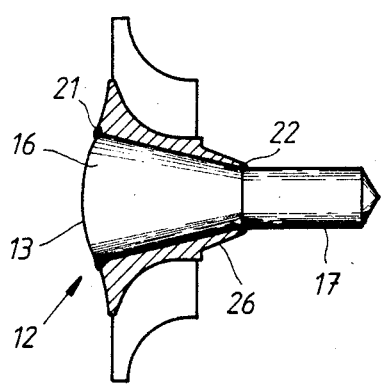
FIG. 4 is a sectional side view of a turbine wheel formed from the parts of FIGS. 2 and 3.

FIG. 4 shows a turbine wheel 12 which is composed of a hub and shaft part 13, shown in FIG. 2, and a ring part 14 with blades 15, shown in FIG. 3. The part 13, which comprises a frusto-conical portion 16 and a circular cylindrical portion 17, is made by compression moulding of silicon nitride powder containing additives which give it a high strength up to a temperature of about 1000° C., for example a mixture of $Al_2O_3$ and $Y_2O_3$, and a low molecular weight plasticizer. The moulded part 13 inhibits a bevelled edge 19 at the end of the portion 16 remote from the portion 17. After heating, to drive off the plasticizer, the relative density of the part 13 is 64 percent of the theoretical density.

The ring part 14, which has a frusto-conical hole 18 conforming to the shape of the frusto-conical portion 16 of the part 13, is made by injection moulding of silicon nitride powder containing one or more additives which result in good properties such as high creep strength at a temperature of 1300° C., for example $Y_2O_3$, and a high molecular weight plasticizer. The moulded part 14 exhibits a bevelled edge 20 at the larger diameter end of the hole 18. After heating, to drive off the plasticizer, the relative density of the part 14 is about 64 percent of the theoretical density. After possible machining of the frusto-conical portion 16 of the part 13 and/or the frusto-conical hole 18 in the part 14, the two parts are assembled together as shown in FIG. 4. The V-section slot formed by the bevelled edges 19 and 20 is filled with jointing material 21, for example silicon nitride powder mixed with a plasticizer. Similar jointing material 22 is also applied over any gap between the end portion 23 of the part 14 and the cylindrical portion 17 of the part 13. The assembled parts 13 and 14 are then heated to drive off plasticizer from the jointing materials 21 and 22. The assembled parts 13 and 14 are then encapsulated with a layer of gas-impermeable material, as described with reference to FIG. 1, and the encapsulated parts are subjected to hot isostatic pressing. The jointing materials 21 and 22 bridge any gaps between the two parts and prevent penetration of capsule material between the parts during the isostatic pressing. During the pressing, the parts are bonded together so that the strength in the joint is equivalent to the strength of the base material. In addition, the properties of the finished turbine wheel in the hub part and the blade part will be optimized for their respective operating conditions.

EXAMPLE 1

A hub and shaft part 13 in FIG. 2 was made by cold isostatic pressing. A silicon nitride powder containing minimum 90% $\alpha$-$Si_3N_4$ and with an specific surface of 8 $m^2/g$ was mixed with 5% $Y_2O_3$ and 2% $Al_2O_3$. The powder was filled into a rubber container approximately of the shape shown in FIG. 2 but with about 35% greater linear dimensions than the finished part. The rubber container was sealed after evacuation and placed in a cold isostatic press. It was then cold isostatically compacted at a maximum pressure of 600 MPa with a sustain time of 5 minutes. After the pressurization the part was taken out of the press and the rubber container was removed. The cold compacted powder body which had a density of 60% of the theoretical was then machined to the desired dimensions in a lathe using alumina tool tips. The frusto-conical surface 16 of the part 13 had a cone angle of 50° and a cylindrical part 19 with 75 mm diameter and a length of 3 mm.

A ring with turbine blades, FIG. 3, was made from a silicon nitride powder with a minimum of 90% $\alpha$-$Si_3N_4$ and 8 $m^2/g$ specific surface to which 1% $Y_2O_3$ had been added. The powder was mixed during 3 h at 180° C. with 15 volume parts LD polyethylene with a melt flow index of 200, a density of 0.915 $g/cm^3$ and a melting point of 100°–103° C., 22 volume parts of a polyethylene wax with a molecular weight of 1600–2200 and 3 volume parts of VP-109 from BYK Mallinckroft Chemische Produkte.

The mixed compound was degassed in vacuum during 0.5 h at 145° C. and was granulated to 1–5 mm lumps after cooling to room temperature. The granulate was filled into an injection moulding barrel which was preheated to 190° C.

The injection moulding into a tool of appropriate shape for the ring and blade configuration of FIG. 3 was made with the tool preheated to 55° C. The injection pressure was 90 MPa during 2.8 seconds and then 60 MPa during 90 seconds. The dimensions of the tool were such that the frusto-conical hole 18 in the part 14 had the same cone angle, 50° as the previously made hub and shaft part but with an allowance of 0.5 mm diametrically for later adjustment.

The injection molded part containing 60 volume parts silicon nitride was embedded in appr. 0.5 mm diameter spherical silica powder. The organic additives were then removed during heating in vacuum. The heating rate was initially 10° C./h up to 150° C. and thereafter 2° C./h. The temperature was increased to 450° C. with a gradual increase of the heating rate to 10° C./h. The total time was 170 h.

The degassed powder body, which was very fragile, was then presintered at 1000° C. in vacuum for 2 h after removal of the silica powder. The dimensions of the frusto-conical part 18 were then adjusted by machining so that a good fit to the conical part 16 of the part 13 was obtained.

The hub and shaft part 13 and the ring and blade part 14 were then assembled according to FIG. 4. Silicon nitride powder was mixed with 57 volume parts paraffin wax with a melting point of 52°14 55° C. The V-section slot formed by the bevelled edges 19 and 20 was filled with this jointing material at about 120° C. The wax was removed with a treatment for 12 h at 150° C. in air and 500° C. in vacuum.

The assembled part was then hot isostatically pressed with a glass encapsulation according to the method described in Brit. Pat. Appl. No. 2048952 A (publ. Dec. 17th, 1980). A maximum temperature of 1700° C. at a pressure of 250 MPa during 1 h was used during the hot isostatic pressing cycle.

On inspection of the finished part after removal of the glass, the parts were found to have bonded completely to one another without any cavities. The strength of the joint was comparable to the strength of the parent materials.

It is to be understood that the above description and accompanying drawing are illustrative only, since equivalent parts and materials to those described could be substituted without departing from the spirit and scope of the invention described in the ensuring claims.

What is claimed is:

1. A method of manufacturing an article of ceramic material, comprising the steps of
   (a) forming a plurality of shaped article parts from a composition containing a powder of ceramic material, at least one of said shaped article parts formed from a composition containing a powder of ceramic material mixed with a plasticizer,
   (b) driving off the plasticizer contained in said at least one shaped article part,
   (c) assembling said plurality of shaped article parts together into a configuration conforming to that of the article to be manufactured, at least one gap being left between two of the assembled shaped article parts,
   (d) applying sufficient jointing material comprising a powder mixed with a plasticizer over the gaps between the assembled shaped article parts to bridge said gaps,
   (e) driving off the plasticizer from said jointing material,
   (f) surrounding the assembled article parts with a gas-impermeable layer, and
   (g) isostatically pressing the assembled article parts at elevated temperature.

2. The method as claimed in claim 1, wherein said gas-impermeable layer is made of glass.

3. The method as claimed in claim 1, wherein said gas-impermeable layer is made of a layer of a glass material which forms a gas-impermeable layer when heated, and wherein said method includes between steps (f) and (g) the step of heating said layer of glass material to form said gas-impermeable layer.

4. The method as claimed in claim 1, wherein a first of said shaped article parts has a greater cross-sectional area than a second of said shaped article parts.

5. The method as claimed in claim 4, wherein in step (a) said first and second shaped article parts are each formed by pressing a composition containing a mixture of powder of ceramic material and a plasticizer, the plasticizer employed in forming said first article part having a lower molecular weight than the plasticizer employed in forming said second article part.

6. The method as claimed in claim 1, wherein said powder of ceramic material is silicon nitride powder.

7. The method as claimed in claim 6, wherein said plasticizer is selected from the group consisting of methyl cellulose, cellulose nitrate, an acrylic binder, a wax and a mixture of waxes.

8. The method as claimed in claim 1, wherein said shaped article parts consist of a hub part which includes a shaft and a ring part which includes projecting blades, the manufactured article of ceramic material being a turbine wheel.

9. The method as claimed in claim 8, wherein said ring part is made of a material having a high creep strength at a high temperature and said hub part is made of a material having a high strength at a low or medium-high temperature.

* * * * *